March 9, 1943.
E. N. JACOBI
2,313,712
COMPARTMENT DOOR LATCH
Original Filed Aug. 3, 1940
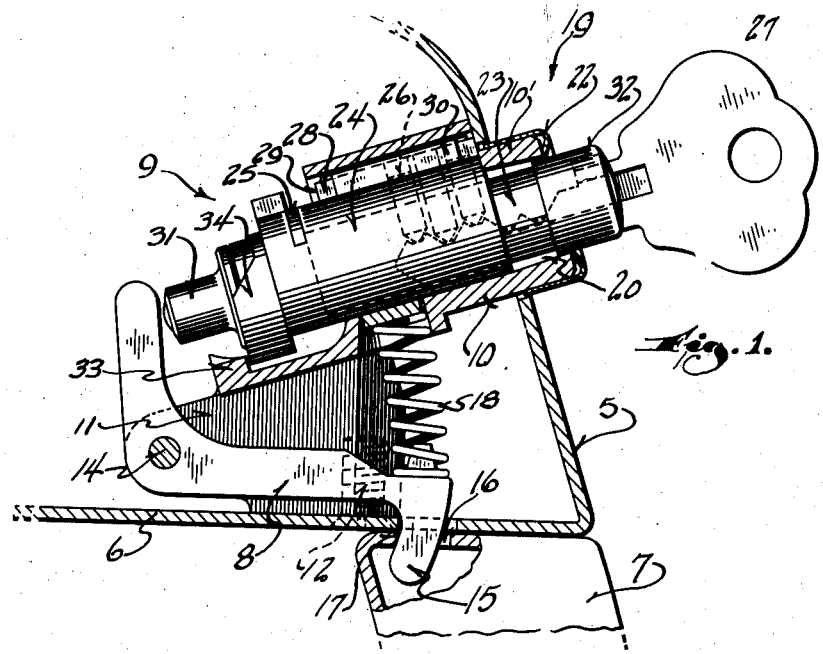
Fig. 1.
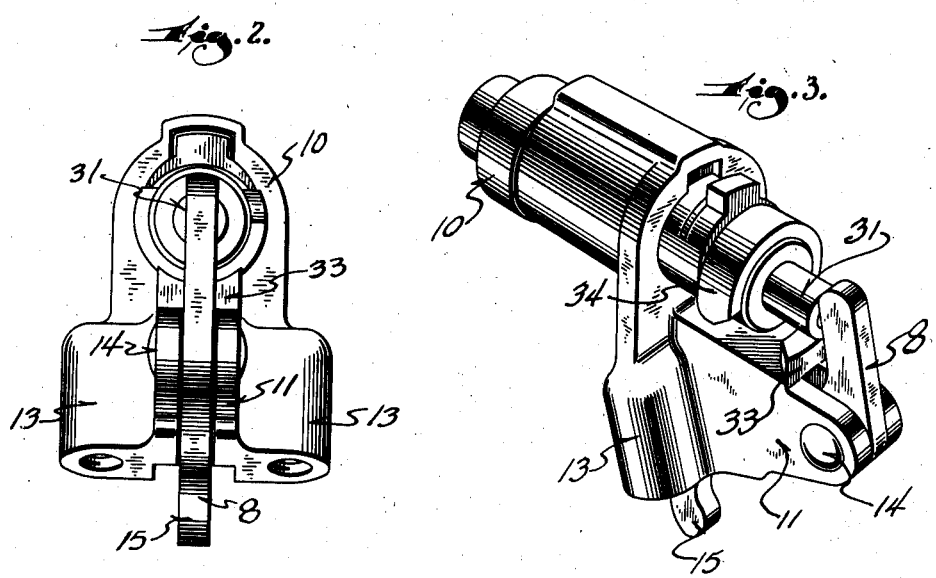
Fig. 2.
Fig. 3.
Inventor
Edward N. Jacobi
By Ira Milton Jones
Attorney Patented Mar. 9, 1943

2,313,712

UNITED STATES PATENT OFFICE 2,313,712

COMPARTMENT DOOR LATCH

Edward N. Jacobi, Milwaukee, Wis., assignor to Briggs & Stratton Corporation, Milwaukee, Wis., a corporation of Delaware Original application August 3, 1940, Serial No. 350,499. Divided and this application February 12, 1942, Serial No. 430,542

7 Claims. (Cl. 70—451)

This invention, like that shown in the copending application of Edward N. Jacobi, Serial No. 350,499, filed August 3, 1940, of which this is a division, relates to automobile glove compartment door latches of the type wherein retraction of the latch bolt is effected by depression of a push button-like actuator and wherein key controlled means operates to block such depression of the actuator and thus lock the compartment door closed.

Inasmuch as security against breaking into the compartment depends to a large extent upon the manner in which the latch device is mounted, the present invention has as one of its objects, the provision of a latch device so constructed that its attachment to its support must be effected from the inside of the compartment so that unless the door is open no access can be had to the attaching means.

With a view toward insuring rigidity in its mounting, it is a further object of this invention to provide a novel manner of mounting the latch device whereby a portion of its body projecting through a hole in the instrument board panel cooperates with a screw secured connection between the roof of the compartment and a bracket on the body.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawing illustrates one complete example of the physical embodiment of the invention constructed according to the best mode so far devised for the practical application of the principles thereof, and in which:

Figure 1 is a sectional view through part of an automobile instrument board and glove compartment illustrating the application of this invention thereto and showing the latch bolt in its operative position;

Figure 2 is a rear end view of the latch device per se; and

Figure 3 is a perspective view thereof.

Referring now particularly to the accompanying drawing, in which like numerals indicate like parts, the numeral 5 designates the instrument board panel of an automobile or the like, behind which a glove compartment is located, only part of the roof 6 of the compartment being shown.

The open front of the compartment is adapted to be closed by a door 7 hinged at its bottom to swing toward and from a closed position illustrated in Figure 1, where it is secured by the bolt 8 of a latch device, indicated generally by the numeral 9.

The latch device 9 is conveniently mounted in the angular space behind the instrument board panel and above the roof of the glove compartment in a position such that the cylindrical front end portion 10' of its body 10 projects through a hole in the instrument board panel. For this purpose the body 10 has a mounting bracket 11 which is seated on the roof 6 of the compartment where it is secured by screws 12 passed upwardly through the roof and threaded into tapped holes in laterally projecting bosses 13.

This manner of mounting the latch device provides maximum protection against breaking into the compartment by loosening the latch unit, inasmuch as access to the attaching screws may be had only when the compartment door is open. Attention is also directed to the fact that the projection of the front end portion 10' of the latch body through a hole in the instrument board panel coacts with the screws 12 to locate the latch device and hold it securely in place.

For the sake of appearance, the projecting front end portion 10' of the body is covered by a bezel 22 neatly finished as by plating and polishing.

The bracket 11 is substantially channel shaped in cross section and has the latch bolt 8 received between its flanges. The bolt is in the form of a bell crank lever pivoted at its apex to the bracket as at 14.

One arm of the latch bolt projects forwardly between the flanges of the bracket and has a downwardly directed hooked end 15 to project through a hole 16 in the roof of the compartment and engage a keeper or striker 17 on the door.

A bolt spring 18 yieldingly urges the latch bolt to its operative keeper engaging position from which it may be retracted by the inward depression of a push button-like actuator indicated generally by the numeral 19. This actuator is slidably mounted in a bore 20 in the body so disposed that the upwardly projecting arm of the latch bolt is substantially in line with the bore.

The actuator unit consists of a lock cylinder 23 rotatably mounted in a casing 24 but secured against endwise movement therein by a cross bar 25 seated in a transverse groove in the casing and engaging in an annular groove in the cylinder.

Key operable tumblers 26 of the pin type serve to hold the cylinder against rotation in its casing except upon the insertion of a proper key 27 into the keyway of the cylinder.

To accommodate the tumblers and their springs, the casing has a substantially rectangular rib or ridge 28 formed thereon through which the tumbler bores pass, and which is slidably received in a groove 29 formed in the body in communication with its bore. The thrust of the tumbler springs is received by a stamped sheet metal cap 30 secured over the rib or ridge 28.

The inner end of the cylinder extends beyond its casing and is reduced in diameter to form a bolt engaging pin 31 which upon inward depression of the assembled casing and cylinder in the manner of a push button rocks the latch bolt about its pivotal mounting to retract the same from its keeper.

To enable such inward depression of the cylinder and casing the outer or front end of the cylinder projects beyond the encased front end portion 10' of the body and for the sake of good appearance, this projecting end of the cylinder is also encased in a finishing shell 32 of plated and polished sheet metal.

By blocking depression of the actuator the latch is secured against retraction and the compartment door is locked closed. For this purpose the bracket portion 11 of the body has a stationary stop abutment 33 positioned between the rear end of its bore and the upwardly projecting arm of the latch bolt.

The stationary stop abutment thus lies in the path of a cam 34 rotatably mounted on the assembled cylinder and casing to block depression of the actuator when the cam is in one position of rotation. In another position of rotation, substantially 180 degrees removed, the cam is ineffective to block depression of the actuator. Rotation is imparted to the cam by key propelled actuation of the cylinder.

From the foregoing description, taken in connection with the accompanying drawing, it will be readily apparent that through the novel manner of mounting the latch device in the angle formed by the roof of the compartment and the instrument board panel, exceptional rigidity and security against forced or accidental loosening of the latch device is achieved. The securement of the latch device to the roof of the compartment by screws inserted from inside the compartment assures security; and the projection of the pilot formed by the front end of the lock body into a hole in the instrument board panel secures the unit against being rocked by outward thrust on the latch bolt. In the absence of this insertion of the pilot into the hole such outward thrust on the latch bolt would very likely flex the relatively thin sheet metal compartment roof and allow the entire latch device to be rocked upwardly.

What I claim as my invention is:

1. In a compartment door lock to be mounted on the door frame of a compartment: a lock body having an extension on its front end; a bezel ring on said extension, said bezel covered extension being positionable in a hole in the face of the door frame; a base portion on the lock body having a surface engageable with the inner face of a supporting wall disposed at an angle to the face of the frame but behind the frame; and a screw for passage through said supporting wall tapped into said base portion to hold the same to the supporting wall and cooperable with the engagement of the bezel covered extension in the hole in the face of the door frame to mount the lock.

2. In a push-type compartment door lock to be mounted on the door frame of a compartment: a bearing for the push button of the lock insertable from the rear into a hole in the face of the door frame; a body for the lock structure connected with said bearing and having a mounting portion adapted to fit against a supporting wall on the inside of the frame and at an angle to the face of the frame; and a fastening screw adapted to pass through said supporting wall tapped into the mounting portion of the body to cooperate with the bearing in mounting the lock, the location of the screw making it accessible only from the inside of the compartment when the lock is in place so that access to the screw is possible only when the compartment door is open.

3. In a compartment door lock to be mounted on the door frame of a compartment having a roof forming an angle to the face of the frame and having a door mounted in the frame for movement to and from a position closing the compartment; a lock body; a pilot portion on the lock body adapted to fit in a hole in the door frame above the roof of the compartment; a mounting portion on the body adapted to engage the top of the roof of the compartment when the pilot portion is fitted in its hole; and a screw for passage through the roof of the compartment from inside the compartment tapped into the mounting portion of the body.

4. In a lock having a key controlled lock cylinder and a latch bolt for locking the door of a compartment which is disposed behind an exposed panel in which the doorway closed by the door of the compartment is located and wherein at least one wall of the compartment forms an angle with the rear face of the exposed panel: a body for the lock; a pilot extension on the front end of the lock body insertable from the rear into a hole in the panel; a mounting bracket on the body having a surface arranged to fit against said designated wall of the compartment when the pilot extension is inserted in its hole in the panel, said bracket being so positioned with respect to the latch bolt that the bolt projects beyond said surface of the bracket to pass through a hole in said designated compartment wall for locking engagement with the door; and fastening means insertable through said designated wall of the compartment from inside the compartment and engageable with the mounting bracket to secure the bracket to said compartment wall so that the securement of the bracket cooperates with the pilot extension when inserted in its hole in the panel to mount the lock body in the angle between said compartment wall and the panel in a manner precluding unauthorized access to the fastening means.

5. A latch device of the character wherein a latch bolt biased to an operative position is retractable by depression of a push button slidably mounted in a supporting body which also mounts the bolt, characterized by the fact that: the latch device is securable in the angle between two adjacent angularly disposed walls with the latch bolt projectable through a hole in one wall and the push button accessible through a hole in the other wall, by the projection of a part on the body into a hole in one wall and the securement of another part of the body to the other wall by means of an attaching member passing through said other wall and engaging the body.

6. A latch device of the character described comprising: a body; a pilot extension on the body adapted to enter a hole in a supporting wall; and a bracket on the body attachable to a second supporting wall angularly disposed with respect to the first supporting wall with the point of attachment spaced from the pilot extension so that said attachment cooperates with the insertion of the pilot extension in its hole to mount the latch device in the angle between the two supporting walls.

7. In a door lock for locking the entrance door of a compartment, the entrance of which is through an exposed panel which forms an angle with the adjacent walls of the compartment: a body for the lock carrying a latch bolt; a boss on the lock body; means for securing said boss to the exterior of one of said walls of the compartment at a point spaced rearwardly of the panel and in a manner positioning the latch bolt for projection through a hole in said wall of the compartment in a direction substantially parallel to the plane of the panel for engagement with a keeper on the door so that forces applied to the bolt by the door and acting at an angle to the face of the door are transmitted into the lock body; and a protrusion on the lock body extending into a hole in the panel from the rear thereof to brace the lock body and said wall of the compartment against deflection under forces acting on the bolt.

EDWARD N. JACOBI.